United States Patent
Hagiwara et al.

(10) Patent No.: US 12,102,036 B2
(45) Date of Patent: Oct. 1, 2024

(54) LAWN MOWER CUTTER HEIGHT ADJUSTMENT

(71) Applicant: HONDA MOTOR CO., LTD., Tokyo (JP)

(72) Inventors: Takashi Hagiwara, Wako (JP); Makoto Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 595 days.

(21) Appl. No.: 17/512,779

(22) Filed: Oct. 28, 2021

(65) Prior Publication Data
US 2022/0132733 A1 May 5, 2022

(30) Foreign Application Priority Data
Nov. 4, 2020 (JP) ................................. 2020-184627

(51) Int. Cl.
*A01D 34/74* (2006.01)
*A01D 34/00* (2006.01)

(52) U.S. Cl.
CPC ........... *A01D 34/74* (2013.01); *A01D 34/008* (2013.01)

(58) Field of Classification Search
CPC ... A01D 34/008; A01D 34/74; A01D 2101/00
See application file for complete search history.

(56) References Cited

U.S. PATENT DOCUMENTS

| | | |
|---|---|---|
| 6,523,283 B2 | 2/2003 | Sueshige et al. |
| 10,080,326 B2 | 9/2018 | Yamamura et al. |
| 2002/0014132 A1 | 2/2002 | Sueshige et al. |
| 2017/0280623 A1 | 10/2017 | Yamamura et al. |

FOREIGN PATENT DOCUMENTS

| | | |
|---|---|---|
| DE | 60104953 T2 | 1/2005 |
| JP | 2001-107329 A | 4/2001 |
| JP | 2017-176117 A | 10/2017 |
| WO | 2014/007694 A1 | 1/2014 |

OTHER PUBLICATIONS

German Office Action for German Patent Application No. 102021127915.1 mailed Mar. 18, 2024 (partially translated).

*Primary Examiner* — Adam J Behrens
*Assistant Examiner* — Ashley A Kaercher
(74) *Attorney, Agent, or Firm* — Thomas | Horstemeyer, LLP

(57) ABSTRACT

A work machine includes a work unit, and an adjustment unit configured to adjust a working height of the work unit. The adjustment unit includes a lifting mechanism configured to lift and lower the work unit; a torque limiter configured to interrupt transmission of a driving force of a motor to the lifting mechanism when the work unit reaches an upper and lower limit positions; and a sensor. The torque limiter includes a transmission member provided to be displaceable between a transmission position at which the driving force is transmitted to the lifting mechanism and a non-transmission position at which the driving force is not transmitted to the lifting mechanism, and an elastic member configured to bias the transmission member to the transmission position. The sensor detects displacement of the transmission member.

6 Claims, 6 Drawing Sheets

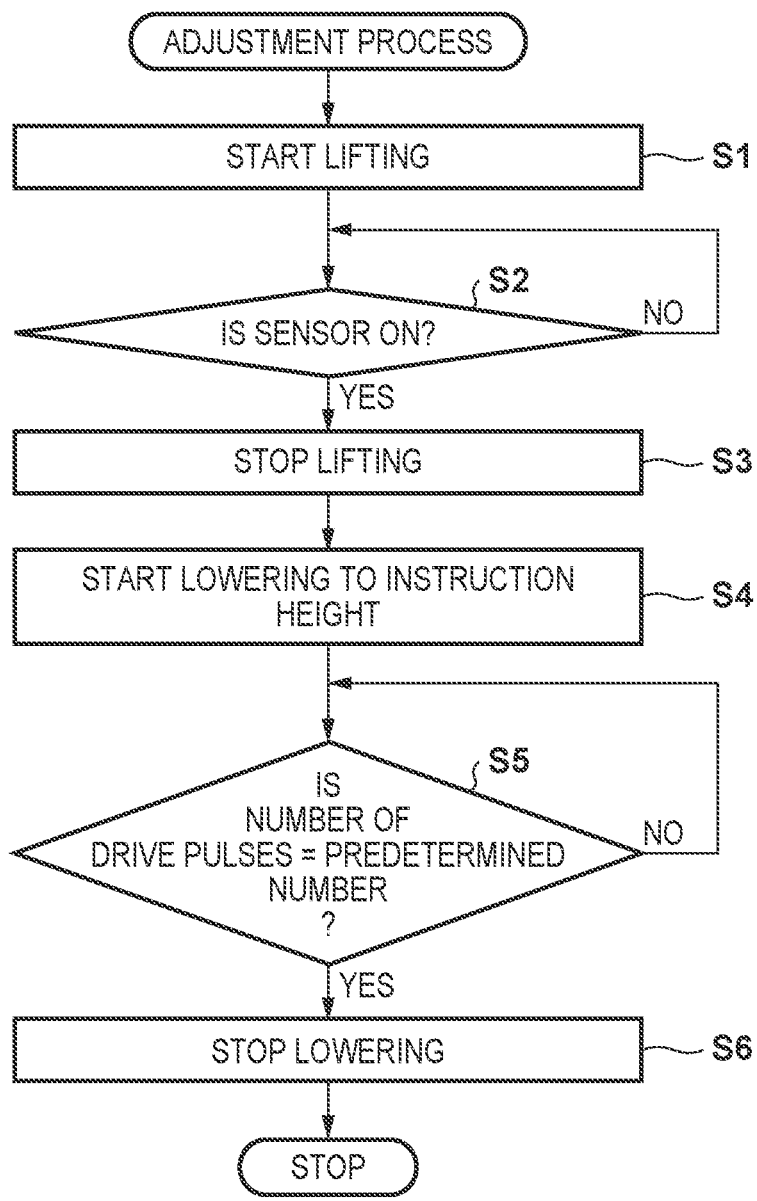

LAWN MOWER CUTTER HEIGHT ADJUSTMENT

CROSS-REFERENCE TO RELATED APPLICATION(S)

This application claims priority to and the benefit of Japanese Patent Application No. 2020-184627 filed on Nov. 4, 2020, the entire disclosure of which is incorporated herein by reference.

BACKGROUND OF THE INVENTION

Field of the Invention

The present invention relates to a work machine such as a lawn mower.

Description of the Related Art

There has been proposed a work machine capable of adjusting the working height of a work unit. For example, Japanese Patent Laid-Open No. 2017-176117 and International Publication No. 2014/007694 each disclose a lawn mower capable of automatically adjusting the lawn mowing height by the driving force of a motor.

As a structure for avoiding the occurrence of an overload state when the work unit reaches the upper limit position or/and the lower limit position, a structure using a torque limiter is conceivable. With this structure, when the work unit reaches the upper limit position or the lower limit position and is in the overload state, the transmission of the driving force of the motor is interrupted by the torque limiter, and the work unit is stopped. This prevents damage to the motor and the lifting mechanism.

However, if the transmission of the driving force of the motor is interrupted by the torque limiter in a case of adopting a control method for controlling the position of the work unit by the rotation amount of the motor, the correlation between the rotation amount of the motor and the position of the work unit is impaired, and the accuracy of identifying the position of the work unit is deteriorated. That is, the accuracy of adjusting the height of the work unit is deteriorated.

SUMMARY OF THE INVENTION

The object of the present invention is to provide a technique for improving the accuracy of adjusting the height of a work unit in a structure using a torque limiter.

According to an aspect of the present invention, there is provided a work machine comprising: a work unit; and an adjustment unit configured to adjust a working height of the work unit, wherein the adjustment unit includes: a motor; a lifting mechanism configured to lift and lower the work unit by a driving force of the motor; a torque limiter configured to interrupt transmission of the driving force to the lifting mechanism when the work unit reaches an upper limit position and a lower limit position; and a sensor configured to detect a state of the torque limiter, the torque limiter includes: a transmission member provided to be displaceable between a transmission position at which the driving force is transmitted to the lifting mechanism and a non-transmission position at which the driving force is not transmitted to the lifting mechanism; and an elastic member configured to bias the transmission member to the transmission position, and the sensor is configured to detect displacement of the transmission member.

Further features of the present invention will become apparent from the following description of exemplary embodiments (with reference to the attached drawings).

BRIEF DESCRIPTION OF THE DRAWINGS

FIG. 6 is a flowchart illustrating a processing example of the control unit.

DESCRIPTION OF THE EMBODIMENTS

Figure 1:
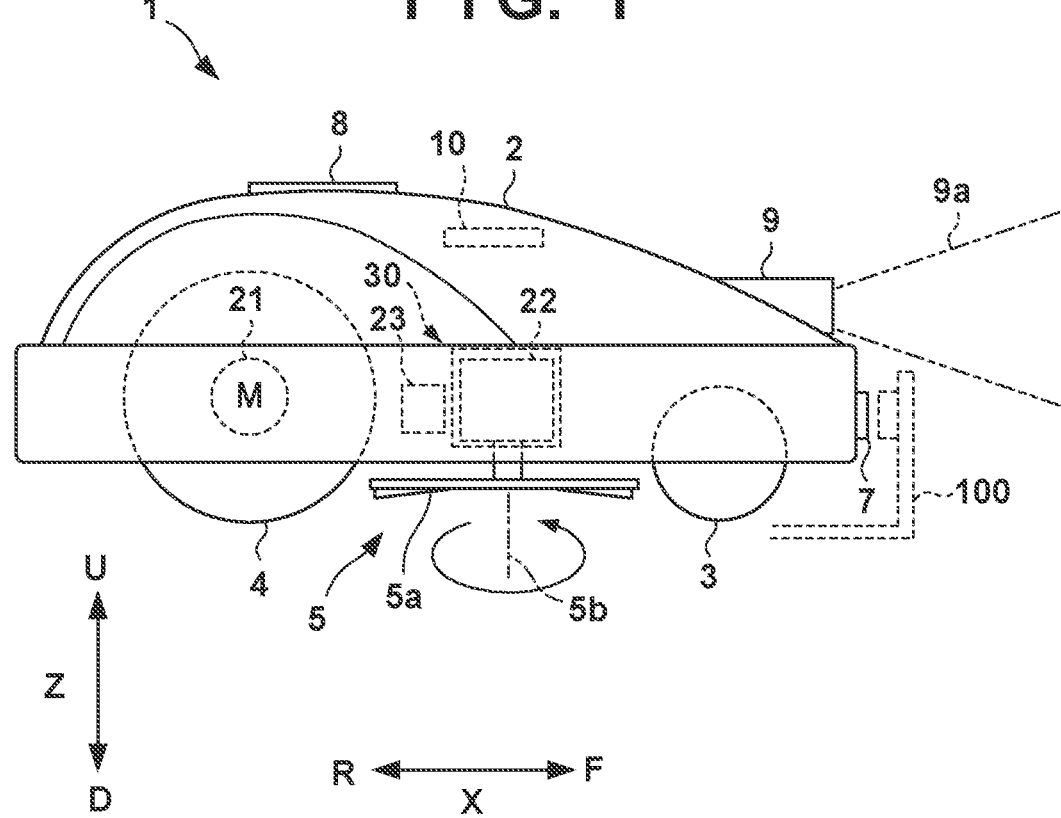
FIG. 1 is a side view of a work machine according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Outline of Autonomous Work Machine>

FIG. 1 is a side view of a work machine 1, to which the present invention is applicable. The work machine 1 in the present embodiment is an autonomous lawn mower that conducts a lawn mowing work while moving in a working site (lawn ground). However, the present invention is also applicable to other types of autonomous work machines or work machines that do not have an autonomous function, such as snow blowers, cultivators, and road paving machines. In the drawings, an arrow X indicates the front-and-rear direction of the work machine 1, F indicates the front side, and R indicates the rear side. An arrow Z indicates an up-and-down direction of the work machine 1, U indicates the upper side, and D indicates the lower side.

The work machine 1 is a four-wheeled vehicle in which left and right front wheels 3 and left and right rear wheels 4 are supported by a vehicle body 2. The left and right rear wheels 4 are driving wheels, and move the work machine 1 on the working site. The rear wheels 4 are each provided with a driving mechanism with a traveling motor 21 as a drive source, and the left and right rear wheels 4 are independently subject to rotation control. The left and right rear wheels 4 are independently subject to the rotation control, so that a traveling direction of the work machine 1 becomes controllable. The left and right front wheels 3 are provided to be freely rotatable.

The work machine 1 includes a work unit 5. The work unit 5 is a mechanism that conducts a lawn mowing work in a working site. The work unit 5 includes a rotary cutter 5a and a motor 22 that outputs a driving force for rotating the rotary cutter 5a about a shaft 5b. The motor 22 is, for example, a DC motor. The rotary cutter 5a is disposed on the lower side of the vehicle body 2 at a central position (between the front wheels 3 and the rear wheels 4) in the front-and-rear direction of the work machine 1. The rotary cutter 5a in the present embodiment is provided with a blade (cutting edge) so as to cut the lawn in either case where the rotation direction is a forward rotation or a reverse rotation. By rotating the rotary cutter 5a while the front wheels 3 and the rear wheels 4 are moving the work machine 1, the lawn mowing work can be conducted.

The work machine 1 includes an adjustment unit 30 that adjusts a working height. The adjustment unit 30 adjusts the height (position in the up-and-down direction) of the rotary cutter 5a from the working site as the working height. Details of the adjustment unit 30 will be described later.

The work machine 1 includes a control unit 10 that is a controller controlling its operation. Details will be described later. An imaging device 9 is provided at a front part of the vehicle body 2. The imaging device 9 is a camera including an imaging sensor such as a CCD sensor or a CMOS sensor, and an optical system such as a lens. In the case of the present embodiment, an imaging range 9a of the imaging device 9 is a front side of the work machine 1. However, the imaging range 9a is not limited to this, and a 360-degree camera may be adopted as the imaging device 9.

An operation panel 8 that receives operation input from a user is provided at the top of the vehicle body 2. The operation panel 8 may be provided with a display unit, and a touch panel display may be adopted as the operation panel 8. The user can input various types of information about the work machine 1 with the operation panel 8. The vehicle body 2 is provided with a connector 7 that electrically connects a charging station 100 and the work machine 1, and the work machine 1 can charge a built-in battery at the charging station 100.

<Adjustment Unit>

Figure 2:
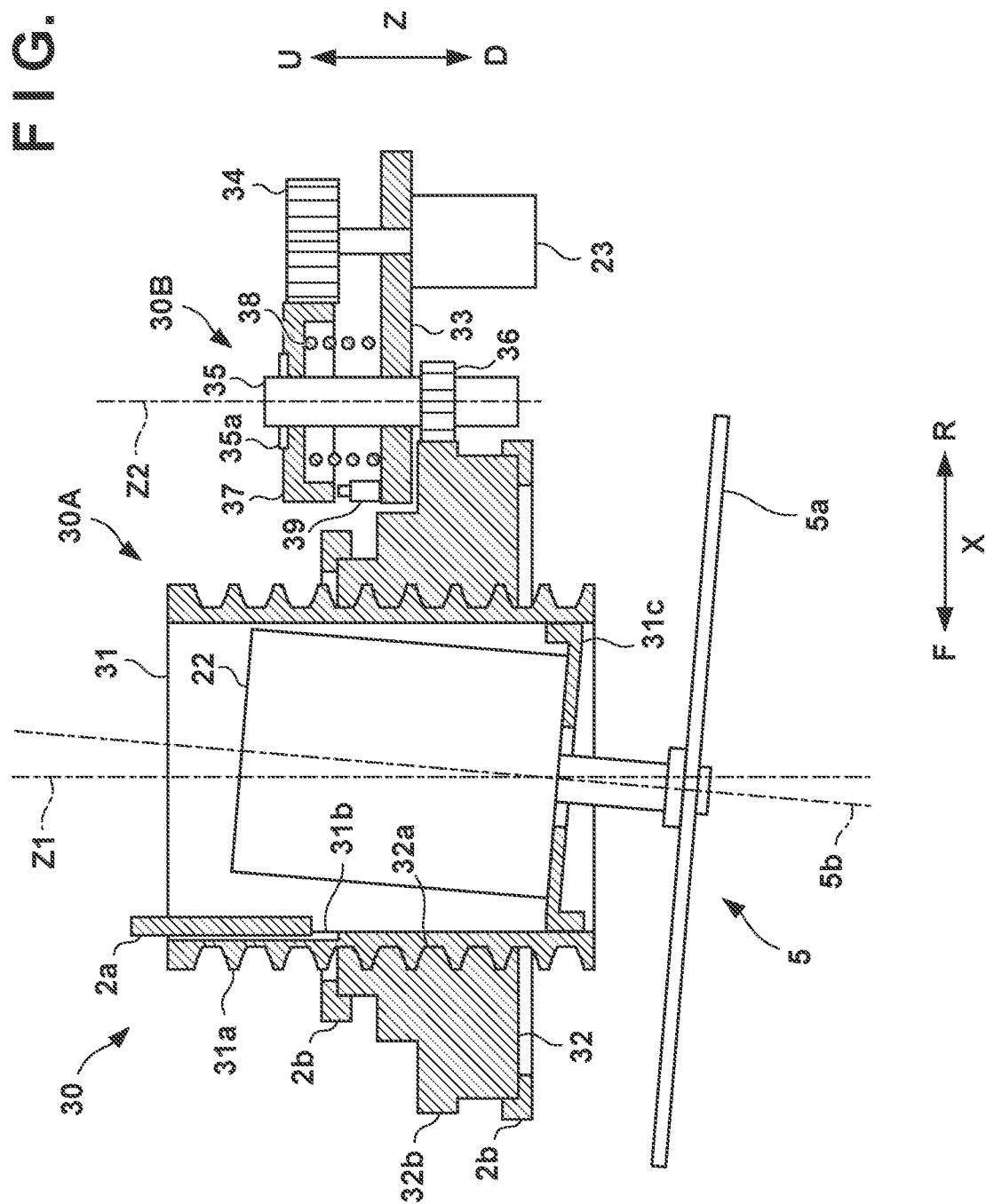
FIG. 2 is an explanatory diagram of an adjustment unit.

FIG. 2 is an explanatory diagram of the adjustment unit 30, and a part of the configuration is illustrated as a cross-sectional view. The adjustment unit 30 includes a lifting motor 23 as a drive source, a lifting mechanism 30A, a torque limiter 30B, and a sensor 39. In the case of the present embodiment, the lifting motor 23 is a stepping motor. The lifting motor 23 is supported by a bracket 33 fixed to a frame (not illustrated) of the vehicle body 2, its output shaft extends in the Z direction, and a spur gear 34 is fixed to the output shaft.

The lifting mechanism 30A is a mechanism that lifts and lowers the work unit 5 in the Z direction by the driving force of the lifting motor 23. The lifting mechanism 30A includes a case 31 that supports the work unit 5. The case 31 has a cylindrical shape in which the cutter motor 22 is accommodated, and its axial direction is directed in the Z direction. An upper end of the case 31 is opened, and a support portion 31c on which the cutter motor 22 is supported is fixed to a lower end. The cutter motor 22 is supported by the support portion 31c with its output shaft slightly inclined from the Z direction, and the output shaft protrudes toward the lower side from the case 31. A rotary cutter 5a is fixed to an end of the output shaft of the cutter motor 22, and the rotary cutter 5a rotates in a posture inclined from the horizontal direction so that the front side of the work machine 1 is slightly higher than the rear side.

A screw thread 31a is formed on the outer peripheral surface of the case 31. A groove 31b extending in the Z direction is formed on an inner peripheral surface of the case 31. A locking piece 2a fixed to the frame (not illustrated) of the vehicle body 2 is inserted into the groove 31b. The groove 31b and the locking piece 2a constitute a detent that restricts the case 31 from rotating about a central axis Z1 parallel to the Z direction.

The lifting mechanism 30A includes an annular rotating body 32 through which the case 31 is inserted. The annular rotating body 32 is supported by a bearing 2b fixed to the frame (not illustrated) of the vehicle body 2 so as to be rotatable about Z1 and not to be displaced in the Z direction. A screw thread 32a that meshes with the screw thread 31a of the case 31 is formed on the inner peripheral surface of the rotating body 32. The case 31 is lifted when the rotating body 32 is rotated in one direction, and the case 31 is lowered when the rotating body 32 is rotated in the opposite direction. The work unit 5 is lifted and lowered by lifting and lowering the case 31. The work unit 5 has an upper limit position and a lower limit position to be lifted and lowered, and these upper limit position and lower limit position are defined by, for example, the configurations of the screw thread 31a and the screw thread 32a, or a stopper provided on the frame (not illustrated) of the vehicle body 2 to regulate a lifting and lowering range of the case 31. A gear 32b is formed on the rotating body 32. The gear 32b is a spur gear that rotates about the central axis Z1.

The torque limiter 30B is a transmission mechanism that transmits the driving force of the lifting motor 23 to the lifting mechanism 30A in a certain torque range. When the work unit 5 reaches the upper limit position or the lower limit position, the transmission of the driving force of the lifting motor 23 to the lifting mechanism 30A is interrupted by utilizing the occurrence of the interlock. The torque limiter 30B includes a support shaft 35, a gear 36, a transmission member 37, and an elastic member 38. The support shaft 35 extends in the Z direction and is supported by a bracket 33 so as to be rotatable about a central axis Z2 parallel to the Z direction. The gear 36 is a spur gear fixed to the support shaft 35, and is an output gear that meshes with the gear 32b of the rotating body 32 and outputs the driving force of the lifting motor 23.

In the case of the present embodiment, the transmission member 37 is a spur gear supported by the support shaft 35 so as to be rotatable about the central axis Z2 and to be displaceable in the Z direction, and is an input gear that meshes with the gear 34 and to which the driving force of the lifting motor 23 is input. A recessed portion for receiving an upper end of the elastic member 38 is formed in a bottom portion of the transmission member 37. In the case of the present embodiment, the elastic member 38 is a coil spring, and the support shaft 35 is inserted through the elastic member 38. A lower end of the elastic member 38 is in contact with the bracket 33, and the elastic member 38 is loaded between the transmission member 37 and the bracket 33. The elastic member 38 constantly biases the transmission member 37 toward the upper side.

Figure 3:
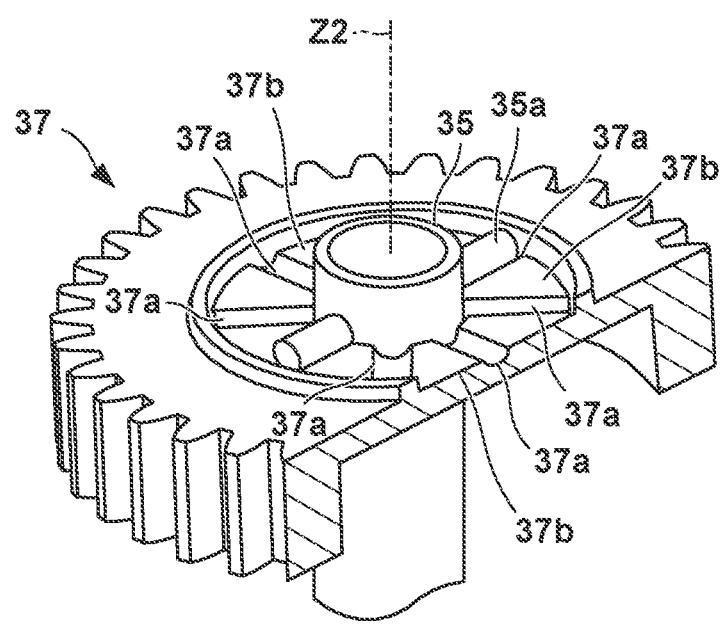
FIG. 3 is a broken perspective view of a transmission member.

FIG. 3 is a partially broken perspective view of the transmission member 37. A plurality of grooves 37a formed in a radial direction from the central axis Z2 is formed on the upper surface of the transmission member 37. A flat shelf portion 37b is formed between the adjacent grooves 37a in the circumferential direction of the central axis Z2. A cylindrical pin 35a protruding in the radial direction is provided at the upper end of the support shaft 35. Each groove 37a has a semicircular cross-sectional shape, and the pin 35a is detachably engaged with the groove 37a. By engaging the pin 35a with the groove 37a, the rotational driving force is transmitted between the support shaft 35 and the transmission member 37. By displacing the transmission member 37 to disengage the pin 35a from the groove 37a, the transmission of the rotational driving force between the support shaft 35 and the transmission member 37 is interrupted.

The sensor 39 detects the displacement of the transmission member 37 to detect the state (transmission, interruption) of the torque limiter 30B. In the case of the present embodiment, the sensor 39 is a push-button-type mechanical switch (for example, a tact switch) that is supported by the bracket 33 and pushed by abutting against the transmission member 37 when the transmission member 37 is displaced to the lower side.

Figure 4:
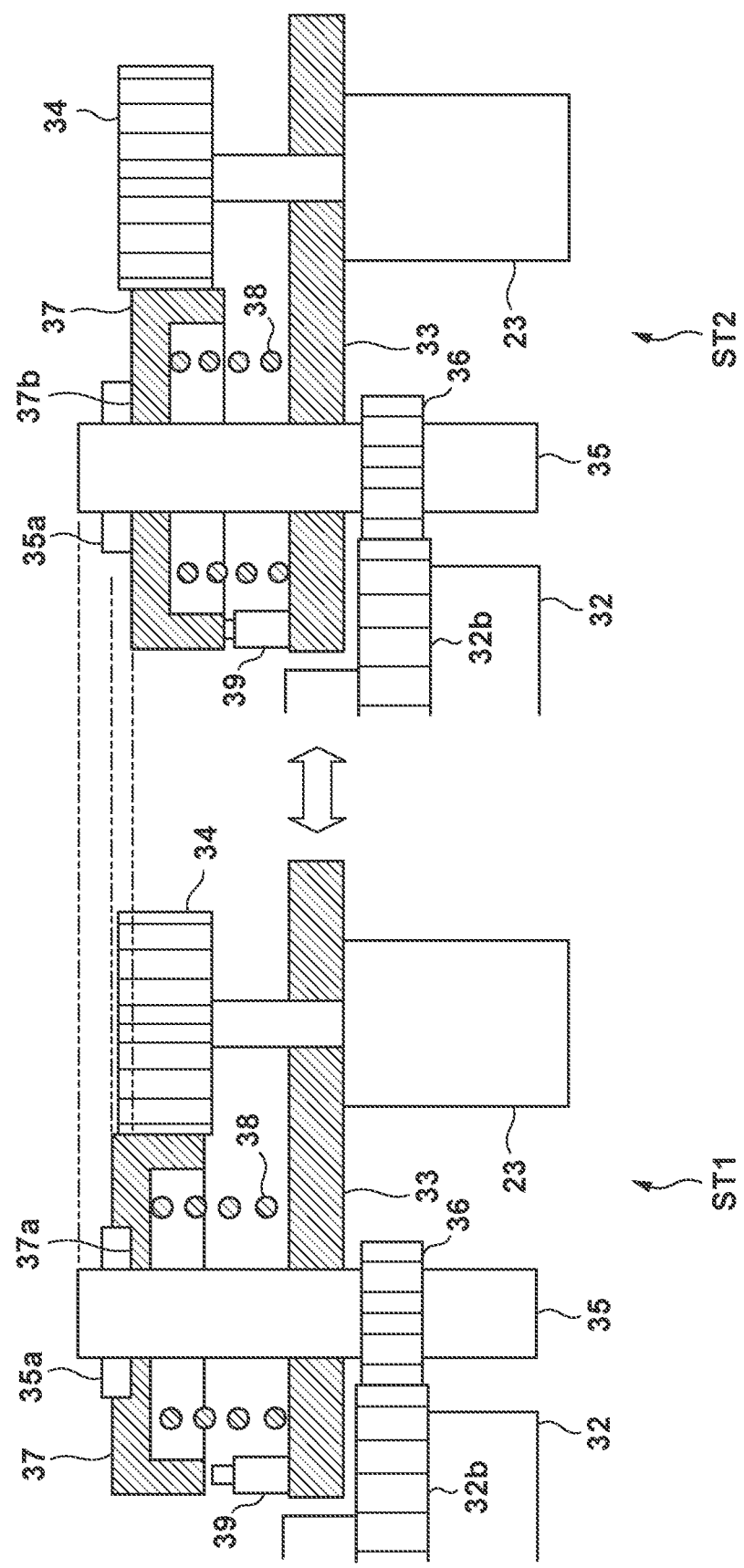
FIG. 4 is an explanatory diagram of the operation of a torque limiter.

FIG. 4 is an explanatory diagram of the operation of the torque limiter 30B. A state ST1 indicates a drive transmission state, and a state ST2 indicates a transmission interruption state. The position of the transmission member 37 in the drive transmission state is referred to as a transmission position, and the position of the transmission member 37 in the transmission interruption state is referred to as a non-transmission position. The non-transmission position is a position lower than the transmission position.

In the drive transmission state of the state ST1, the driving force of the lifting motor 23 is transmitted to the gear 34→the transmission member 37→(the engagement between the groove 37a and the pin 35a)→the support shaft 35→the gear 36→the gear 32b of the rotating body 32. When the work unit 5 reaches the upper limit position or the lower limit position, the rotating body 32 cannot rotate further, and the torque limiter 30B is in an overload state.

Then, although the pin 35a acts to come out of the groove 37a, the position of the pin 35a in the Z direction is immovable, and the transmission member 37 is pushed down to the non-transmission position against the bias of the elastic member 38 and reaches the transmission interruption state of the state ST2. At this time, the pin 35a is positioned on the shelf portion 37b. When the position of the transmission member 37 is lowered, the button portion of the sensor 39 is pushed against the bottom surface of the transmission member 37, and the sensor 39 is turned ON. Accordingly, the control unit 10 recognizes that the torque limiter 30B has reached the transmission interruption state.

Since the elastic member 38 biases the transmission member 37 to the transmission position, when the transmission member 37 further rotates in either direction, the pin 35a is engaged with the groove 37a again, and the torque limiter 30B returns to the drive transmission state. The sensor 39 returns to OFF, and the control unit 10 recognizes that the torque limiter 30B has returned to the drive transmission state.

<Control Unit>

Figure 5:
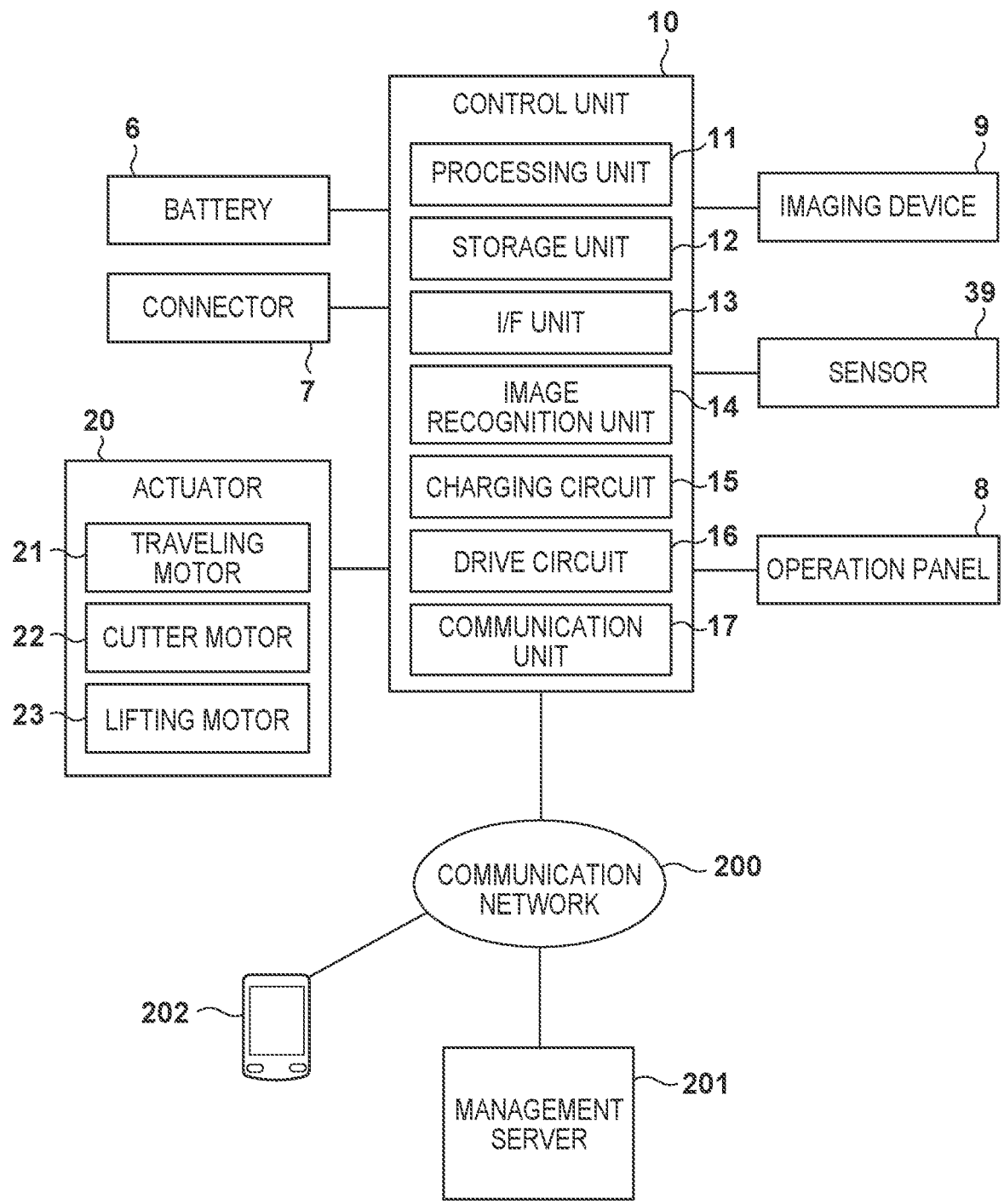
FIG. 5 is a block diagram of a control unit and a peripheral structure of the work machine in FIG. 1.

FIG. 5 is a block diagram illustrating configurations of the control unit 10 and its periphery. The control unit 10 includes a processing unit 11, a storage unit 12 such as a RAM, a ROM, and the like, and an interface unit (I/F unit) 13 that relays transmission and reception of signals between an external device and the processing unit 11. The processing unit 11 is a processor represented by a CPU, and executes a program stored in the storage unit 12 to control an actuator 20 and the imaging device 9. The actuator 20 includes the traveling motor 21, the cutter motor 22, and the lifting motor 23. The processing unit 11 controls driving of these motors via a drive circuit 16.

The control unit 10 also includes an image recognition unit 14 that recognizes the content of an image that has been captured by the imaging device 9. The image recognition unit 14 is, for example, an image processing processor, and analyzes a captured image to specify the type of an object included in the captured image. The image recognition unit 14 may function as artificial intelligence that has been subject to machine learning specialized for image recognition. The processing unit 11 recognizes a marker on the working site, an obstacle, and the charging station 100, based on a recognition result of the image recognition unit 14. By recognizing the marker, the current position of the work machine 1 can be recognized, and by recognizing the obstacle, the operation for avoidance can be performed.

The control unit 10 also includes a charging circuit 15 that charges a battery 6. The charging circuit 15 is capable of charging the battery 6 with the electric power supplied from the charging station 100 via the connector 7. The control unit 10 also includes a communication unit 17. The communication unit 17 is capable of wirelessly communicating with a management server 201 or a mobile terminal 202 such as a smartphone via a communication network 200. The management server 201 is a server that manages the state of the work machine 1, and is capable of, for example, managing information about a plurality of work machines 1. The management server 201 is also capable of wirelessly communicating with the mobile terminal 202 via the communication network 200. The mobile terminal 202 is, for example, a terminal of a user of the work machine 1 (an owner or a work manager of the working site), and is capable of receiving information about the work machine 1 from the management server 201. Accordingly, the user is able to monitor the work machine 1 even at a place away from the work machine 1.

<Control Example>

An example of the control of the control unit 10, in particular, an example of the adjustment control of the working height of the work unit 5 by the adjustment unit 30 will be described. FIG. 6 is a flowchart illustrating an example of the control to be executed by the control unit 10. The working height of the work unit 5 is instructed to the control unit 10 by the operation panel 8, the management server 201, or the mobile terminal 202 (referred to as an instruction height). With this instruction as a trigger, the control unit 10 performs the processing of FIG. 6 to lift and lower the work unit 5 to the instructed working height. The work unit 5 is lifted or lowered depending on the rotation direction of the lifting motor 23. Here, for convenience of explanation, it is assumed that the work unit 5 is lifted when the lifting motor 23 is rotated forward and is lowered when the lifting motor 23 is rotated backward.

In the present embodiment, since the lifting motor 23 is a stepping motor, its rotation amount can be recognized from the number of drive pulses to the lifting motor 23, and the height of the work unit 5 can be recognized without a sensor that detects the rotation amount. However, at the stage of starting the work machine 1 or the like, the current height of the work unit 5 cannot be specified. For this reason, the work unit 5 is first moved to the upper limit position or the lower limit position, and the work unit 5 is moved to the instruction height based on that position. In the example of FIG. 6, the work unit 5 is first moved to the upper limit position.

In S1, the forward rotation drive of the lifting motor 23 is started to lift the work unit 5. The detection result of the sensor 39 is monitored to determine whether that the sensor 39 has been turned ON in S2. When the sensor 39 has been turned ON, this means that the torque limiter 30B is in the transmission interruption state and that the work unit 5 has reached the upper limit position or the lower limit position. When the sensor 39 has been turned ON while the lifting motor 23 rotates forward, it can be determined that the work unit 5 has reached the upper limit position. When it is determined that the sensor 39 has been turned ON, the processing proceeds to S3 to stop the drive of the lifting motor 23 and stop the lifting of the work unit 5.

In S4, the reverse rotation drive of the lifting motor 23 is started to lower the work unit 5 to the instruction height. During the reverse rotation drive of the lifting motor 23, the drive pulses supplied to the lifting motor 23 are counted. In S5, it is determined whether the number of drive pulses has reached a predetermined number (the number of drive pulses corresponding to the instruction height). When it is determined that the number of drive pulses has reached the predetermined number, the processing proceeds to S6 to stop the drive of the lifting motor 23 and stop the lowering of the work unit 5. Accordingly, the work unit 5 is positioned at the instruction height.

As described above, according to the present embodiment, since it is possible to detect that the work unit 5 is at the upper limit position or the lower limit position based on the sensor 39 and the rotation direction of the lifting motor 23, it is possible to provide a technique for improving the accuracy of adjusting the height of the work unit 5 in the structure using the torque limiter 30B. In addition, one sensor 39 can detect that the work unit 5 is at each of the upper limit position and the lower limit position, and it is possible to reduce the number of sensors as compared with a structure in which sensors corresponding to these respective positions are provided. Furthermore, if a switch is used as the sensor 39 as in the present embodiment, an inexpensive sensor is sufficient.

In the present embodiment, the example in which a stepping motor is used as the lifting motor 23 has been described, but instead of this, a DC motor and an incremental encoder that detects its rotation amount may be used. Even in this example, the work unit 5 is only required to be first moved to the upper limit position or the lower limit position and then to be moved to the instruction height based on the detection signal of the incremental encoder (the rotation amount of the DC motor).

The structures of the lifting mechanism 30A and the torque limiter 30B are not limited to the above examples, and various structures can be adopted. For example, the lifting motor 23 is disposed in the vertical posture in which its rotation axis is the vertical direction in the present embodiment, but may be disposed in the horizontal posture in which its rotation axis is the horizontal direction. In this case, the drive transmission direction is converted using a bevel gear, a worm gear, or the like to transmit the rotational force to the torque limiter 30B. The sensor 39 is not limited to the above example, and any sensor such as a magnetic proximity sensor can be adopted.

Summary of Embodiment

The above-described embodiments disclose at least a work machine described as follows.

1. A work machine (1) according to the above embodiment including:
    a work unit (5); and
    an adjustment unit (30) that adjusts a working height of the work unit, in which
    the adjustment unit (30) includes:
    a motor (23);
    a lifting mechanism (30A) that lifts and lowers the work unit by a driving force of the motor;
    a torque limiter (30B) that interrupts transmission of the driving force to the lifting mechanism when the work unit reaches an upper limit position and a lower limit position; and
    a sensor (39) that detects a state of the torque limiter, the torque limiter includes:
    a transmission member (37) provided to be displaceable between a transmission position at which the driving force is transmitted to the lifting mechanism and a non-transmission position at which the driving force is not transmitted to the lifting mechanism; and
    an elastic member (38) that biases the transmission member to the transmission position, and
    the sensor detects displacement of the transmission member.

According to this embodiment, it is possible for the sensor to detect that the work unit has reached the upper limit position or the lower limit position.

Accordingly, it is possible to provide a technique for improving the accuracy of adjusting the height of the work unit in a structure using the torque limiter.

2. In the above embodiment, the work machine further includes a control unit (10) that controls the adjustment unit, in which
    the control unit adjusts the working height of the work unit based on a detection result of the sensor and a rotation amount of the motor (FIG. 6).

According to this embodiment, it is possible to adjust the working height of the work unit from a state in which the current height of the work unit is unknown.

3. In the above embodiment, the work machine further includes a control unit (10) that controls the adjustment unit, in which
    the motor is a stepping motor, and
    the control unit adjusts the working height of the work unit based on a detection result of the sensor and the number of drive pulses to the motor (FIG. 6).

According to this embodiment, it is possible to adjust the working height of the work unit without a sensor that detects the rotation amount of the motor.

4. In the above embodiment,
    the work machine is a lawn mower,
    the working height is a lawn mowing height, and
    the work unit includes:
    a cutter (5a); and
    a motor (21) that outputs a driving force for rotating the cutter.

According to this embodiment, it is possible to adjust the lawn mowing height.

5. In the above embodiment,
    the transmission member (37) is an input gear supported on a support shaft (35) in such a manner as to be rotatable and to be displaceable in an axial direction,
    the elastic member (38) is a coil spring through which the support shaft (35) is inserted,
    the support shaft (35) is provided with a pin (35a) protruding in a radial direction, and
    the input gear (37) has a groove (37a) disposed between the coil spring (38) and the pin (35a) and with which the pin (35a) engages.

According to this embodiment, it is possible to provide the torque limiter having a relatively simple structure.

6. In the above embodiment,
    the lifting mechanism (30A) includes:
    a tubular case (31) supporting the work unit; and
    an annular rotating body (32) through which the case is inserted,
    a screw thread (31a) is formed on an outer peripheral surface of the case,
    a screw thread (32a) that meshes with the screw thread (31a) of the case is formed on an inner peripheral surface of the rotating body, and a gear (32b) meshing with an output gear (36) provided on the support shaft (35) is formed on an outer peripheral surface of the rotating body.

According to this embodiment, by using a lead-screw-type rotary-motion/linear-motion conversion mechanism as the lifting mechanism, it is possible to improve the performance of maintaining the working height of the work unit.

7. In the above embodiment, the sensor is a switch to be pushed by the input gear that is displaced in the axial direction.

According to this embodiment, it is possible to obtain the adjustment unit that is relatively inexpensive.

The invention is not limited to the foregoing embodiments, and various variations/changes are possible within the spirit of the invention.

What is claimed is:

1. A lawn mower comprising:
a work unit comprising a cutter, and a first motor configured to output a driving force for rotating the cutter; and
an adjustment unit configured to adjust a working height of the work unit, the working height comprising a lawn mowing height, wherein
the adjustment unit includes:
a second motor;
a lifting mechanism configured to lift and lower the work unit by a driving force of the second motor;
a torque limiter configured to interrupt transmission of the driving force to the lifting mechanism when the work unit reaches an upper limit position and a lower limit position; and
a sensor configured to detect a state of the torque limiter, the torque limiter includes:
a transmission member provided to be displaceable between a transmission position at which the driving force is transmitted to the lifting mechanism and a non-transmission position at which the driving force is not transmitted to the lifting mechanism; and
an elastic member configured to bias the transmission member to the transmission position, and
the sensor is configured to detect displacement of the transmission member.

2. The lawn mower according to claim 1, further comprises a control unit configured to control the adjustment unit, wherein
the control unit is configured to adjust the working height of the work unit based on a detection result of the sensor and a rotation amount of the second motor.

3. The lawn mower according to claim 1, further comprises a control unit configured to control the adjustment unit, wherein
the second motor is a stepping motor, and
the control unit is configured to adjust the working height of the work unit based on a detection result of the sensor and the number of drive pulses to the second motor.

4. The lawn mower according to claim 1, wherein
the transmission member is an input gear supported on a support shaft in such a manner as to be rotatable and to be displaceable in an axial direction,
the elastic member is a coil spring through which the support shaft is inserted,
the support shaft is provided with a pin protruding in a radial direction, and
the input gear has a groove disposed between the coil spring and the pin and with which the pin engages.

5. The lawn mower according to claim 4, wherein
the lifting mechanism includes:
a tubular case supporting the work unit; and
an annular rotating body through which the case is inserted,
a screw thread is formed on an outer peripheral surface of the case,
a screw thread that meshes with the screw thread of the case is formed on an inner peripheral surface of the rotating body, and
a gear meshing with an output gear provided on the support shaft is formed on an outer peripheral surface of the rotating body.

6. The lawn mower according to claim 4, wherein the sensor is a switch to be pushed by the input gear that is displaced in the axial direction.

* * * * *